United States Patent [19]
Greve

[11] Patent Number: 4,983,549
[45] Date of Patent: Jan. 8, 1991

[54] METHOD FOR RECYCLING PLASTIC COMPOSITE MATERIALS

[75] Inventor: Bruce N. Greve, Davisburg, Mich.

[73] Assignee: The Budd Company, Troy, Mich.

[21] Appl. No.: 247,747

[22] Filed: Sep. 22, 1988

[51] Int. Cl.⁵ ............................................... C03C 6/00
[52] U.S. Cl. ..................................... 501/27; 501/155; 264/37; 65/18.1; 65/18.3
[58] Field of Search ..................... 501/27, 155; 264/37; 65/18.1, 18.3

[56] References Cited

U.S. PATENT DOCUMENTS

| | | | |
|---|---|---|---|
| 2,976,161 | 11/1956 | Smith | 501/27 |
| 3,668,177 | 6/1972 | Van Herpt . | |
| 3,991,005 | 11/1976 | Wallace | 264/37 |
| 3,995,819 | 12/1976 | Kunogi et al. | 241/58 |
| 4,018,722 | 4/1977 | Baker | 260/2.3 |
| 4,030,984 | 6/1977 | Chambers | 264/37 |
| 4,111,730 | 9/1978 | Balatinecz . | |
| 4,123,584 | 10/1978 | Brewton | 428/379 |
| 4,250,222 | 2/1981 | Mavel et al. | 428/285 |
| 4,344,579 | 8/1982 | Morita et al. | 241/34 |
| 4,563,509 | 1/1986 | Liang . | |
| 4,632,690 | 12/1986 | Colwell, Jr. et al. | 501/155 |

OTHER PUBLICATIONS

Jun. 21, 1988 Letter from Philip Bridges of Conrad Industries, Inc. to Mr. Kedar Agarwal accompanying a copy of Test Results from Pyrolysis of Sheet Mold Compound (SMC).
"Recycled Thermosets Announced by Premix", by Bernie Miller, Plastics World, p. 22, (Jul. 1990).
"Firm Finds Way to Recycle Circuit Boards", by Bruce Vernyl, Plastics News, p. 5, (Jun. 11, 1990).
"Thermoset Recycling may be Possible", by Bruce Vernyl, Plastics News, (Feb. 26, 1990).
"Materials Recycling is Possible—Only Grade Purity Promises Recyclability—Thermoset Plastics Struggle to Catch Up in Recycling Efforts", by Bernd Aur. VDI nachrichten (Mar. 23, 1990), (German Paper and English Translation).
"Premix Regrinds SMC, BMC for use as Fillers", by B. Vernyl, Plastics News, pp. 1 and 5, (undated).
"Thermoset Polyester Molding Compounds Contain Recycle", Plastics Technology, p. 13, (Jul. 1990).
PlasticsBRIEF—Reinforced Plastics Newsletter, p. 3, May 29, 1990, vol. 14, No. 22.
PlasticsBRIEF—Reinforced Plastics Newsletter, pp. 7 and 8, Feb. 26, 1990, vol. 14, No. 9.
"DSM to Expand Auto Recycling Operations", by Herb Short, Plastics News, pp. 1 and 5, (undated).
Presentation by Irvin Posten at an SPI Composites Institute Annual Conference in Washington, D.C., (in Feb. 1990).
Test Results from Pyrolysis of Sheet Molding Compound (SMC), Report from Conrad Industries, Jun. 21, 1988.
Thermoset Recycling is Coming by Matt Naitove, Plastics Technology (Apr., 1990), Discussing General Motors Activities from 6/88 Through 1/90.
Report from Conrad Industries entitled Test Results from Pyrolysis of Sheet Mold Compound (SMC), Jun. 21, 1988.

Primary Examiner—William R. Dixon, Jr.
Assistant Examiner—David M. Brunsman
Attorney, Agent, or Firm—Harness, Dickey & Pierce

[57] ABSTRACT

A method is disclosed for recycling reinforced plastic composite materials. The reinforced plastic composite material is heated to separate said plastic matrix material from said reinforcement material. At least the separated reinforcement material is recycled. The products produced by these methods and processes are also disclosed.

59 Claims, 1 Drawing Sheet

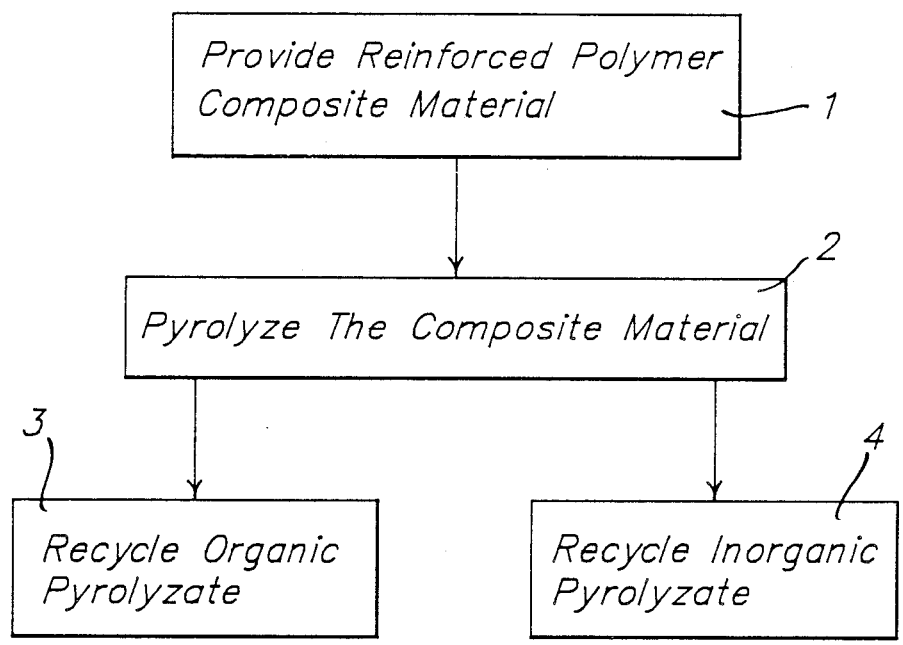

METHOD FOR RECYCLING PLASTIC COMPOSITE MATERIALS

TECHNICAL FIELD

This invention relates to recycling plastic composite materials. More particularly, this invention relates to recycling ceramic reinforced thermosetting plastic composite materials.

BACKGROUND OF THE INVENTION

In recent years there has been an increased demand placed on materials producers to develop corrosion resistant, stronger and lighter materials. In an effort to meet this demand, materials producers have turned towards the use of reinforced composite plastic materials, such as ceramic reinforced plastic composites. A typical ceramic reinforced composite plastic material comprises a plastic matrix (thermosplastic and/or thermosetting) having ceramic reinforcement material therein.

One particular type of composite material, glass fiber reinforced plastic composites, has received added attention in recent years due to its applications in industries such as automotive, aerospace, electronic, appliance, construction, and marine. For example, Sheet Molding Compound (SMC) has become a popular choice for these applications. Sheet molding compound is a composite material typically comprising a thermosetting resin, glass fiber reinforcement, inorganic fillers, and small amounts of catalysts and other additives. Because of the presence of a thermosetting matrix material, like many modern composite materials, sheet molding compound cannot readily be melted. Consequently, as with many thermosetting-plastic containing materials, sheet molding compound is generally regarded as non-recyclable.

At present, one of the most economical methods for disposal of reinforced plastic composites, including scrap and factory waste, is to bury such material in a landfill. Unfortunately, landfill sites are increasingly becoming more scarce. As a result, costs have increased to use presently available landfill sites. Thus, there has been an increased need felt to develop a process whereby scrap and waste reinforced plastic composites can be recycled and used in the manufacture of new articles.

Several methods for recycling reinforced thermosetting plastic composites have been proposed. One method is to collect the scrap, and then shred and grind it. This idea is disclosed in connection with recycling thermosetting materials in U.S. Pat. No. 3,995,819, issued Dec. 7, 1976. Depending on the final size of the shredded particles, the resulting shredded material is then used as a filler material, blended in various matrices as discussed in U.S. Pat. No. 4,344,579, issued Aug. 17, 1982; and U.S. Pat. No. 4,123,584, issued Oct. 31, 1978. Unfortunately, there are drawbacks to this method, including the fact that various matrices require different particle sizes. To produce such a variety of useful particle sizes it is necessary to use special equipment, which entails high operational and maintenance costs. Further, the performance characteristics of the ground material, as a filler in many materials, has not yet been demonstrated.

It has been suggested that sheet molding compound scrap could be incinerated to recover the fuel energy present in the organic portion (i.e. the thermosetting polymer portion) of the compound. Unfortunately, incineration results in high ash content (50% to 60%). This ash still requires disposal, thereby failing to significantly reduce the waste disposal problem previously discussed.

It is a present practice in the nuclear waste containment industry to encapsulate contaminated material in glass encasements. This is accomplished by fusing a mass of sand around the contaminated material to form a glass charge. The charge, however, has no further recyclable uses and must be buried.

SUMMARY OF THE INVENTION

Methods and processes are disclosed for recycling reinforced plastic composite materials. A reinforced plastic composite material having a reinforcement material and a plastic matrix material therein is provided. This composite material is heated to separate said plastic matrix material from said reinforcement material. At least the separated reinforcement material is recycled. The products produced by these methods and processes are also disclosed.

Among the advantages of the present invention is that reinforced plastic composite materials can now be recycled to form materials of relatively high quality suitable for subsequent applications. This provides an important environmental and commercial advantage since the ability to recycle plastic composites ultimately increases yield from original raw materials. Further, long run material costs will be decreased due to the reduced waste disposal problems.

BRIEF DESCRIPTION OF THE DRAWINGS

The various advantages of the present invention will become apparent to one skilled in the art by reading the following specification and by reference to the drawings in which:

FIG. 1 is a flow diagram depicting the steps of recycling a reinforced plastic composite material.

DESCRIPTION OF THE PREFERRED EMBODIMENT

The methods of the present invention relate to the recycling of reinforced plastic composites. In a preferred embodiment of the present invention a method is disclosed for recycling ceramic reinforced thermosetting plastic composites. In a highly preferred embodiment, a method is disclosed for recycling sheet molding compound (SMC). The products produced by these methods are also disclosed.

Reinforced plastic composites, as used herein, comprise a reinforcement material and a plastic matrix material. Preferably the reinforcement material is inorganic. This invention relates to separating the plastic matrix material from the reinforcement material, and recycling at least the separated reinforcement material.

More particularly, in a present preferred embodiment pertaining to a reinforced plastic composite employing an inorganic reinforcement material, this invention relates to separating the organic and inorganic constituents of the plastic composites by heating the composite. The term "plastic", as used herein, encompasses the term polymer with its scope. "Plastic composites," as used herein, refer to those composites comprising a thermoplastic, thermosetting plastic, or mixtures thereof. For example, the present invention may be used to recycle reinforced composites including, without limitation, sheet molding compounds, bulk molding compounds, reinforced reaction injection molding materials, reinforced resin transfer molding materials, pultrusions, filament wound or tape layup articles and materials, glass reinforced plastic composite materials, and ceramic reinforced plastic composite materials.

Preferably the matrix of the plastic composite materials employed in methods and products of the present invention comprises a thermoplastic or a thermosetting plastic. Preferably, thermoplastic matrix materials within the scope of the present invention include polyethylene, polypropylene, nylon, polyvinylchloride, acetal, acrylonitrile-butadiene-styrene, polyamide-imide, polycarbonate, polyphenylene sulfide, polysulfone, polyether, ether ketone, polyether-imide, and mixtures thereof. More preferably, the thermoplastics useful in the process and products of the present invention are selected from the group consisting of polyethylene, polypropylene, nylon, polyvinylchloride, acetal, acrylonitrite-butadiene-styrene, polycarbonate, and mixtures thereof.

In a preferred embodiment, thermosetting plastic matrix materials useful in the processes and products of the present invention include polyester, vinyl ester, epoxy, polyurethane, phenolic, diallyl phthalate, melamine, furane, urea, polyimide, and mixtures thereof. More preferably, useful thermosetting plastics are selected from the group consisting of polyester, vinyl ester, epoxy, polyurethane and mixtures thereof. Employment of mixtures of thermoplastic and thermosetting plastics are also within the scope of the present invention.

Reinforcement materials useful in the methods and products of the present invention are typically materials which typically impart improved properties, such as chemical, physical and/or electrical properties, to a polymer matrix material when used in connection therewith. Reinforcement materials, as found in reinforced plastic composites, are generally inorganic-based materials; that is, they are composed primarily of an inorganic material, but may include organic materials. In one aspect of the present invention, the inorganic material is a ceramic compound such as ceramic compounds selected from the group consisting of oxides, carbides, nitrides, and mixtures thereof. For instance, inorganic reinforcement materials useful in the methods and products of the present invention include many ceramic compounds such as those containing glass, boron, silicon carbide, and/or carbon/graphite. Typical glasses include, without limitation, known glasses such as E-glass, S-glass, C-glass, and mixtures thereof.

In addition to reinforcement material and plastic matrix materials, it is typical that reinforced plastic composites comprise a filler material. Suitable filler materials include, without limitation, carbonates, oxides, hydrates, clays, talcs, and the like. Further, fillers of the present invention may also comprise recycling additives such as those described herein.

In some instances it is to be appreciated that organic reinforcement material is used in reinforced plastic composites. The methods and processes of the present invention are adaptable with slight modifications to recycling those materials also. Examples of organic reinforcement materials useful in the methods and products of the present invention include para-aramid and polyethylene materials.

Reinforcement material, as found in reinforced plastic composites, can be of a variety of forms such as fibers, rovings continuous and chopped strand mat, textile yarn and fabric. They may also be in the form of weaves, knits, and the like.

Upon commencement of separation by heating a reinforced plastic composite comprising organic and inorganic constituents, e.g. pyrolyzing, the organic constituents are contemporaneously recycled into organic pyrolyzate. The term "recycle" as used herein refers to the common usage of the term, and includes the act of reprocessing a material, or a product of a re-processed material, for re-use in subsequent applications, either as a final product or an intermediate product. Organic pyrolyzate, as referred to herein, is a product obtained from pyrolysis of organic constituents and may include combustible gasses and/or oils within its scope. Where the organic pyrolyzate comprises such combustible gasses and/or oils, the gasses and/or oils can be collected and used as fuel which can be used to sustain the pyrolysis. Thus organic constituents of the composites useful in the methods and products of present invention can be effectively recycled into fuel which can be used to sustain pyrolysis. The inorganic material that remains after pyrolysis, i.e. ash, can be mixed with a predetermined amount of a recycling additive to form a recycled material. The recycled material can be reprocessed to a relatively high quality state and can then be used in the manufacture of new products requiring relatively high quality material.

Various additional inorganic material additives can be added to the inorganic materials of the present composites to yield a readily recyclable composition. The additional inorganic materials, i.e. "recycling additives" are materials suitable for interacting with inorganic fillers and/or reinforcement material of reinforced plastic composites to facilitate the formation and/or modify the properties of a recycled material composition. In some instances, recycling additives may include various components of the fillers found in the initial material; where "initial material" refers to the composite material as provided, prior to recycling. In the case of composites employing ceramic reinforcement materials, the recycling additives are referred to as "ceramic making" or "ceramic-additive" compounds. Recycled materials of the present invention are of high quality and may be used as starting material for subsequent applications.

Referring to step 1 of FIG. 1, to recycle a reinforced plastic composite material according to one aspect of the present invention, the first step is to provide a reinforced plastic composite material having a reinforcement material and a plastic matrix therein. Typically, the step of providing the initial composite material involves gathering of scrap, waste or other material-to-be-recycled. Gross contamination is removed from the gathered material. Gross contamination, as used herein, includes metal studs, mounting plates, hardware, stones, wire, metal banding, and other material, the continued presence of which is undesirable in the recycled material.

The contamination can be separated from the material to be recycled using any suitable sorting method including manual sorting methods, magnetic separation, and sorting methods employing an air cyclone.

If necessary the gathered material is then comminuted into one or more predetermined particle sizes. The matter is comminuted by chopping, slicing, shredding, crushing, pulverizing, or the like. Particle sizes can be chosen so as to affect subsequent processing steps, such as heating, the duration and ease of which partially depend on particle size.

Referring to step 2 of FIG. 1, the reinforced plastic composite material is loaded into a first chamber suitable for pyrolyzing the material, and the material is pyrolyzed. One of the main purposes of pyrolysis in the present embodiment is to separate the plastic matrix material from the reinforcement material of the reinforced plastic composite material. Additionally, pyrolysis is employed to facilitate separation of the plastic matrix material from the composite's filler materials. The first chamber is equipped with a suitable heat source such as a furnace. For instance, without limitation, the first chamber could be a chamber such as a shaft, fluidized bed reactor, batch furnace, or rotary kiln.

Thus, as used herein (in connection with recycling a material comprising an organic constituent such as reinforced plastics) the term "pyrolyzing" refers to the step of heating the material to one or more predetermined temperatures for one or more predetermined periods of time to substantially decompose the material's organic constituent controlled preferably under controllable conditions. Preferably, for many reinforced plastic composites, the step of pyrolyzing, i.e. pyrolysis, involves heating the material to a temperature in the range of at least about 500° F., at one or more predetermined pressures. The upper range of the temperatures is limited by the characteristics of the material pyrolyzed as well as operating limitations imposed on the process, such as equipment limitations. The pressure employed in the methods of the present invention depends largely upon operating conditions such as pyrolysis temperature and, in some instances, may be varied to affect the amount of time for which pyrolysis is desired. In the present aspect of the invention, the pressure is about atmospheric or slightly below atmospheric. The time or times required to pyrolyze a reinforced plastic composite ranges from several minutes to several hours. Nonetheless, where operating conditions and/or the need to pyrolyze relatively large amounts of material dictate, longer times may be required. Hence, like the upper temperature limit, pyrolysis time is largely dependent upon factors such as the amount and type of composite material, relative amounts of matrix and reinforcing material, material moisture content, material particle size, resin content, as well as the pyrolysis temperature.

For a typical reinforced composite having a thermosetting solid resin matrix, the thermosetting resin can be pyrolyzed to form products such as hydrogen gas, carbon monoxide, carbon dioxide, and an alkane or alkene gas compound.

Hence, a primary purpose of pyrolysis in the present invention is typically to vaporize, or decompose, substantially all of the organic constituents of a reinforced plastic composite material. Upon decomposition or vaporization, the organic material is thus substantially separated from the composite material's other constituents, including inorganic reinforcement material, thereby facilitating isolation of the composite's inorganic constituents.

As indicated by step 3 of FIG. 1, under the conditions set forth herein, organic constituents of the present composite are substantially recycled into combustible gas or oil pyrolysis products. The gas and/or oil produced, i.e., organic pyrolyzate is separable from the remaining organic and inorganic material due to its substantially non-solid phase. The organic pyrolyzate can then collected and/or used as fuel to sustain pyrolysis. Because of the ability to effectively separate organic and inorganic constituents, plastic materials including thermosetting materials can effectively be recycled into useful materials using the present process.

Pyrolysis continues for one or more predetermined lengths of times at one or more predetermined temperatures. Typically pyrolysis will continue until decomposition or vaporization of the organic constituents is substantially complete. This typically requires several minutes, but may last several hours or longer and depends upon factors including the amount and type of composite material, relative amounts of matrix and reinforcement material, material moisture content, material particle size, resin content and pyrolysis temperature.

Upon completion of pyrolysis, i.e. when the organic constituents of the reinforced plastic composite have substantially decomposed, there remains an "ash" in the chamber. The term "ash" refers to the material remaining from the initial composite material which has failed to undergo substantial decomposition during pyrolysis. Ordinarily, ash, i.e. inorganic pyrolyzate will comprise inorganic reinforcement material, which has been separated from the composite's plastic matrix material and any additional inorganic materials, such as fillers, found in the initial reinforced plastic composite.

The ash that remains is transferred to a second chamber having therein a melting furnace or other suitable furnace for fusing or otherwise treating the ash. The ash is charged into the furnace. Additionally, a predetermined amount of a recycling additive is added to the ash mixture. The recycling additive may be added to the ash mixture in any suitable manner including methods of dry blending the material using equipment such as batch muller, revolving double-cone, vertical screw, ribbon or turbine-type blenders.

With regard to composites employing ceramic reinforcement, recycling additives include "ceramic additives" or "ceramic-making compounds". "Ceramic additive" or "ceramic-making" compounds refer to those compounds which are used to form ceramics, including raw materials; or modify the chemical, physical, and/or electrical properties of a ceramic. Ceramic additives useful in the methods and products of the present invention include, without limitation, glass additives, silica ($SiO_2$), soda ash ($Na_2CO_3$), salt cake ($Na_2SO_4$) sodium nitrate ($NaNO_3$), potash ($K_2CO_3.5H_2O$), limestone ($CaCO_3$), dolomite ($CaCO_3MgCO_3$), boric acid ($B_2O_3.H_2O$), borax ($Na_2B_4O_7.10H_2O$), feldspar ($K_2Na_2O.Al_2O_3.6SiO_2$), flourspar, bauxite, kaolin clay, ball clay, and mixtures thereof.

For materials having glass reinforcements, such as SMC, the term ceramic additives refers, without limitation, to known glass additives such as glass formers, intermediates, modifiers and mixtures thereof. More particularly, glass formers include compounds containing an element selected from the group consisting of boron, silicon, germanium, aluminum, phosphorus, vanadium, arsenic, antimony, zirconium and mixtures thereof.

Glass intermediates include compounds containing an element selected from the group consisting of titanium, zinc, lead, aluminum, thorium, beryllium, zirconium, cadmium and mixtures thereof.

Glass modifiers include compounds containing an element selected from the group consisting of scandium, lanthanum, yttrium, tin, gallium, indium, thorium, lead, magnesium, lithium, zinc, barium, calcium, strontium, cadmium, sodium, potassium, rubidium, mercury, cesium and mixtures thereof.

When glass additives are employed during the recycling of glass reinforced plastic composites, they may be added to a melt of recycled glass reinforcement in predetermined amounts while the glass reinforcement is in a glass melting furnace.

Amounts and types of recycling additives employed in the methods and products of the present invention are chosen with regard to the ultimate properties and uses desired of the recycled material, as well as the composition of the composite material. That is, the physical chemical, or electrical properties the ultimate recycled material can be controlled by careful selection of the type and amount of recycling additives employed.

Composite materials recycled according to the methods of the present invention can be viewed as a system of materials which comprises a reinforcement material. The components of the system will vary as to their physical state depending upon the processing stage of the composite. That is, the system may be viewed during its pre-manufacture state, i.e. at a time prior to forming the initial composite material, wherein plastic material and reinforcement material is provided to prepare a reinforced plastic composite. Likewise, the system may be viewed in a post-pyrolysis state, where substantially all that remains from the composite is inorganic ash, and plastic matrix material has been broken down into a gas or oil.

Recycling additives employed in the methods and products of the present invention may be added to the inorganic material of the reinforced composite material system after it has been reduced to ash. Optionally, the compounds may be added to the original inorganic starting material system before pyrolysis, or during manufacture of the initial composite. That is, as described in connection with a plastic composite reinforced with inorganic material, recycling additives may be introduced to the inorganic material at a time prior to forming the initial pre-recycled composite. For instance, the recycling additives may be introduced as inorganic filler material to a reinforced plastic composite. If this step is optionally employed, it should be appreciated that this earlier addition would likely reduce the amount of additive necessary to be added during subsequent recycling steps. Further, one aspect of the present invention contemplates introduction of recycling additives to the initial reinforced plastic composite before pyrolysis, and introduction of recycling additives to ash after pyrolysis.

As shown in step 4 of FIG. 1, once contained within the melting furnace, or other suitable furnace, the ash having recycling additives mixed therein, is heated to one or more predetermined temperatures for one or more predetermined lengths of times to melt and fuse together the ash mix to form a recycled material comprising at least substantially all of the separated reinforcement material that was contained in the ash mixture. This fusion step thereby recycles inorganic pyrolyzate from the pyrolyzed reinforced plastic composite. For instance, where the inorganic pyrolyzate comprises ceramic reinforcement, to melt and fuse substantially all of the mixture it is preferable to heat the materials to a temperature of at least about 2000° F. This heating step is preferably done under an oxidizing, or an inert gas atmosphere. The pressure employed in the methods of the present invention depends upon operating conditions such as melting temperature and, in some instances, may be varied to affect the amount of time necessary for the melting and fusing reaction to occur. In the present aspect of the invention, the pressure is about atmospheric or slightly below atmospheric. The amount of time necessary to melt and fuse the ash mix depends, in part, on the amount of ash heated.

A resulting fused "virgin" material is thereby obtained. By "virgin" material, it is meant a recycled material which is suitable for inclusion as a component in subsequently prepared materials. The virgin material will typically be of relatively high quality, and exhibit substantially homogeneous compositions and properties.

The ability to recycle reinforcement materials according to the present invention is an important advancement in the field of reinforced polymer composite materials. For instance, in the area of glass-reinforced composites, previously there has been difficulty in reprocessing recovered glass due to an inability to effectively separate glass reinforcement, such as fiber, from the material's matrix. The present invention is directed toward overcoming this inability.

Further, the presence of filler materials in reinforced plastic composites imposes limitations on compositions obtainable by simply melting inorganic material found in the composites. Thus, another important aspect of the present invention is the ability to modify the properties of plastic composite reinforcement materials with predetermined amounts of recycling additives.

It is appreciated that subsequent applications of the recycled material may optionally require higher purity virgin material than otherwise obtainable under the above conditions. In those situations, it is preferable to refine the material using suitable refining methods known for such material. For instance, it is possible to refine certain materials by known dilution or filtration methods. It should be recognized, however, that it is difficult to purify many materials once they are in a molten state. Therefore, where possible, care should be taken to control impurities during previously discussed scrap sorting and contamination removal steps.

The resulting virgin material can be processed to prepare it for subsequent handling. Alternatively, it may be processed into a finished product. For instance, while the material is molten it may be molded into a predetermined form or charge. Such forms include, without limitation, rods, tubes, spheres, ingots, or the like. Further, it is possible, to fabricate fibrous materials using the molten virgin material.

Finally, the material is cooled using suitable cooling methods. The cooling method employed depends largely upon the microstructure desired upon cooling. Microstructure can be controlled by selection of an appropriate cooling rate. Possible methods of cooling include rapid water quenching, and air cooling.

When cooled, the virgin material is suitable for application by itself, or in combination with other recycled material, as a high-quality recycled material. Alternatively the material may be charged into a melt of newly prepared, previously un-recycled material to form a high-quality material.

The following example serves to further explain the scope of the present invention.

EXAMPLE

Sheet molding compound (SMC) is a glass reinforced thermosetting plastic composite. Typically, SMC is a composite material comprising organic and inorganic constituents. More particularly, SMC comprises an organic thermosetting resin; inorganic materials, including glass fiber reinforcement and inorganic fillers; and small amounts of catalysts and other additives. It should be appreciated by one skilled in the art that once SMC is heat activated and cured it becomes infusible. Hence, because it cannot be melted, and due to the presence of different materials in the composite, SMC is generally regarded as non-recyclable.

A typical SMC composition reciting approximate percentages is illustrated in Table I. All percentages are by weight unless otherwise indicated.

TABLE I

| Organic Material | |
|---|---|
| Thermosetting Resins | 24.4% |
| Low Profile Additives | 13.1% |
| Mold Release | 0.7% |
| Catalyst | 0.2% |
| Inorganic Material | |
| 1" Chopped E-glass Reinforcement | 25.0% |
| Thickener (MgO) | 0.2% |
| Filler ($CaCO_3$) | 36.4% |
| | 100% |

Thermosetting resins that are used in SMC include those which decompose and/or vaporize upon heating at high temperatures, to form oils and/or gasses, and include unsaturated polyester, vinyl ester, epoxy, diallyl phthalate, polyurethane, and mixtures thereof.

Low profile additives that are used in SMC embodiment include thermoplastic polymers such as acrylics, polyvinyl acetate, styrene copolymers, polyvinyl chloride, cellulese acetate butyrate, polycaprolactones, thermoplastic polyester, polyethylene, and mixtures thereof.

Preferred mold release agents comprise zinc stearate. Alternative agents comprise calcium stearate, stearic acid, and other suitable mold released agents known in the art.

The preferred catalyst contains tertiary-butyl peroctoate and tertiary-butyl perbenzoate. Other catalysts may contain benzoyl peroxide, methylethyl ketone peroxide, or pentanedione peroxide.

The inorganic materials of the present preferred reinforced plastic composite include a reinforcement material, inorganic thickeners and fillers. Sheet molding compound typically is reinforced with a one-inch long chopped glass fiber roving. The composition of this roving is of a type commonly known as E-glass. E-glass roving is presently commercially available under the trade name Owens Corning Type 30. The diameter of a typical E-glass fiber roving is about 10-20 microns. E-glass, like many ceramic reinforcement material, is available in forms other than rovings including woven roving, continuous and chopped strand mat, textile yarn, and fabric.

E-glass has several properties that render it an advantageous reinforcement material For instance, E-glass has good electrical insulation properties, relatively high strength, good durability, good chemical resistance and readily permits fiber formation.

A typical composition of E-glass is illustrated in Table II.

TABLE II

| Material | % by Weight |
|---|---|
| $SiO_2$ | 52-56 |
| $Al_2O_3$ | 12-16 |

TABLE II-continued

| Material | % by Weight |
|---|---|
| CaO | 16-25 |
| MgO | 0-6 |
| $B_2O_3$ | 8-13 |
| $Na_2O$ | 0-0.3 |
| $TiO_2$ | 0-0.4 |
| $Fe_2O_3$ | 0-0.4 |
| $F_2$ | 0-0.5 |

Preferred inorganic fillers used in SMC include calcium carbonate ($CaCO_3$). Calcium carbonate is also a popularly employed glass making ingredient. Thus, it is appreciated that other inorganic fillers including, without limitation, oxides or hydrates, may be used either singly or in combination with $CaCO_3$ as filler material in the present invention. For instance, filler materials sometimes found in SMC include hydrated alumina, kaolin clays and talcs. In the present example the filler materials include hydrated alumina.

Various thickeners may optionally be employed singly or in combination with magnesium oxide (MgO) and include calcium oxide, calcium hydroxide, or magnesium hydroxide. In one aspect of the present example alumina trihydrate is added to the initial SMC material during its manufacture to modify the formula for SMC according to Table III:

TABLE III

| Organic Material | |
|---|---|
| Thermosetting Resins | 24.4% |
| Low Profile Additives | 13.1% |
| Mold Release | 0.7% |
| Catalyst | 0.2% |
| Inorganic Material | |
| 1" Chopped E-glass Reinforcement | 25.0% |
| Thickener (MgO) | 0.2% |
| Filler ($CaCO_3$) | 25.8% |
| Alumina Trihydrate | 10.6% |
| | 100% |

To recycle scrap SMC, the first step is to gather SMC-to-be-recycled. Contamination is then removed. The organic and inorganic constituents of the SMC are separated by pyrolyzing scrap SMC at a temperature of at least about 500° F. Pyrolysis occurs in a first chamber at about atmospheric pressure or slightly below atmospheric pressure. The SMC is pyrolyzed until substantially all the organic constituents are decomposed or vaporized. This requires several minutes to several hours depending upon factors including the amount of SMC pyrolyzed, as well as material's moisture content, particle size, resin content, pyrolysis temperature, and the like.

Under these conditions the organic constituents of SMC are recycled into combustible pyrolysis products which can then be collected and/or used as fuel to sustain pyrolysis. Upon completion of pyrolysis, substantially all of the remaining material is ash. That is, for pyrolyzed SMC the remaining inorganic pyrolyzate is an ash comprising inorganic fillers, thickeners, and E-glass reinforcement.

The ash is then charged into a glass melting furnace. Additionally, a predetermined amount of a glass additive is added to the ash mixture. Glass additives include known glass formers, glass intermediates, glass modifiers or mixtures thereof. In the present example the glass additives are magnesium oxide (MgO), silicon dioxide ($SiO_2$), and boron oxide ($B_2O_3$).

The glass additives react with the ash, including the E-glass and alumina remaining in the ash, upon melting to form a recycled E-glass material. The amounts and types of glass additives are chosen with regard to the ultimate properties and uses desired of the recycled E-glass material.

In the present example, glass additives (e.g. alumina trihydrate) have been added to the pre-recycled SMC material as filler. Further, glass additives (e.g. MgO, $SiO_2$, and $B_2O_3$) have been introduced to the system by adding to the ash after pyrolysis. It should be noted, however, that glass additives may optionally be introduced to the system comprising reinforcement material by adding the additives to the inorganic ash only after the SMC has been reduced to ash. Alternatively, additives can be introduced to the system comprising reinforcement materials by adding the additives to the inorganic constituents of SMC only before forming the manufacture of initial pre-recycled sheet molding compound.

Once contained within the glass melting furnace, or other suitable furnace, the ash having glass additives mixed therein is heated to obtain a molten glass. This requires heating to a temperature of at least about 2000° F. in an oxidizing or inert gas atmosphere for a time which is dependent largely upon the amount of material charged to the furnace. More preferably the temperature is in a range of about 2000° F. to about 2500° F. The pressure is maintained at substantially atmospheric pressure.

A resulting "virgin glass" material is thereby obtained. The virgin glass material has substantially the same composition as E-glass, is substantially homogeneous in composition and properties, and is suitable for fabrication into articles.

The virgin glass material optionally may be refined for applications requiring higher purity materials. The virgin glass is then molded and cooled.

An advantage of the present invention, in connection with SMC, is the ability to easily recycle E-glass in high yields. That is, E-glass found in SMC is often in the form of short length fibers interspersed within an organic matrix. By using the methods of the present invention, E-glass fibers can be separated from the plastic matrix of a reinforced polymer composite. The fibers can then be recycled into a useful product.

A typical recycled glass material prepared according to the methods of the present example has the composition listed in Table IV.

TABLE IV

| Material | % by Weight |
| --- | --- |
| $SiO_2$ | 52% |
| $Al_2O_3$ | 12% |
| CaO | 25% |
| MgO | 3% |
| $B_2O_3$ | 8% |
| | 100% |

Further, in the present example, the yield of products with respect to amounts of additions supplied to the material described in Table III is illustrated in Table V.

TABLE V

| Material | Starting lbs | After Pyrolysis | Additions |
| --- | --- | --- | --- |
| Organics | 0.384 | 0.0 | — |
| Glass Fiber | 0.250 | 0.250 | — |
| MgO | 0.002 | 0.002 | 0.015 |
| $SiO_2$ | — | — | 0.300 |
| $B_2O_3$ | — | — | 0.082 |
| $CaCO_3$ | 0.258 | 0.144 (CaO) | — |
| $Al_2O_3$ ($3H_2O$) | 0.106 | 0.069 ($Al_2O_3$) | — |
| Totals | 1.000 lbs | 0.465 lbs | 0.397 lbs |

While the present invention has been disclosed in connection with the preferred embodiment thereof, it should be understood that there may be other embodiments which fall within the spirit and scope of the invention and that the invention is susceptible to modification, variation and change without departing from the proper scope or fair meaning of the following claims.

What is claimed is:

1. A method for recycling a reinforced plastic composite material comprising the steps of:
   (a) providing a reinforced plastic composite material having a reinforcement material including inorganic constituents and a plastic matrix material therein;
   (b) pyrolyzing said reinforced plastic composite material to separate said plastic matrix material from said reinforcement material; and
   (c) forming a virgin glass material from said inorganic constituents of said separated reinforcement material.

2. The method of claim 1 wherein said providing step (a) additionally comprises:
   (1) removing gross contamination from gathered material-to-be-recycled; and
   (2) comminuting said gathered material.

3. The method of claim 1 wherein said pyrolyzing step (b) additionally comprises:
   (1) heating said composite material to pyrolyze said composite material's organic constituents;
   (2) recycling said pyrolyzed organic constituents; and
   (3) transferring ash material remaining from said composite material which has failed to undergo substantial decomposition during pyrolysis to a second chamber having a suitable furnace for fusing said remaining ash material.

4. The method of claim 1 wherein step (c) comprises:
   (1) adding an additive which interacts with said inorganic constituents to form the recycled material to said reinforcement material; and
   (2) heating said system to fuse together and form a recycled material.

5. The method of claim 1 wherein an additive which interacts with said inorganic constituents to form the recycled material is added a time prior to pyrolyzing said reinforced plastic composite.

6. The method of claim 1 wherein an additive which interacts with said inorganic constituents to form the recycled material is added after the reinforced plastic composite has been pyrolyzed.

7. The method of claim 1 wherein said reinforced plastic composite material is a reinforced thermoplastic composite material.

8. The method of claim 1 wherein said reinforced plastic composite material is a reinforced thermosetting composite material.

9. The method of claim 1 wherein said reinforced plastic composite material is a ceramic reinforced plastic composite material.

10. The method of claim 9 wherein said reinforced plastic composite material is a glass reinforced plastic composite material.

11. The method of claim 9 wherein said reinforced plastic composite material is a carbide ceramic reinforced plastic composite material.

12. The method of claim 9 wherein said reinforced plastic composite material is a ceramic fiber reinforced plastic composite material.

13. The method of claim 1 wherein said reinforced plastic composite material is a reinforced thermoplastic composite material selected from the group consisting of composites of polyethylene, polypropylene, nylon, polyvinyl chloride, polyacetal, acrylonitrile-butadiene-styrene polymer, polyamide-imide polymer, polycarbonate, polyphenylene sulfide, polysulfone, polyether, polyether-ketone polymer, polyether-imide polymer, and mixtures thereof.

14. The method of claim 1 wherein said reinforced plastic composite material is a reinforced thermosetting composite material selected from the group consisting of composites of polyester, vinyl ester, epoxy, polyurethane, phenolic, diallyl phthalate, melamine, furane, urea, polyimide, and mixtures thereof.

15. The method of claim 1 wherein said reinforced plastic composite material comprises a matrix comprising a mixture of thermoplastic and thermosetting plastic materials.

16. The method of claim 4 wherein said adding step (1) comprises adding a ceramic additive selected from the group consisting of, silica, soda ash, salt cake sodium nitrate, potash, limestone, dolomite, boric acid, borax, feldspar, flourspar, bauxite, kaolin clay, ball clay, and mixtures thereof.

17. The method of claim 4 wherein said adding step (1) comprises adding a glass additive selected from the group consisting of glass formers, glass modifiers, glass intermediates, and mixtures thereof.

18. A method for recycling ceramic reinforced thermosetting polymer composite materials comprising the steps of:
   (a) providing a ceramic-reinforced thermosetting polymer composite material having organic and inorganic constituents therein;
   (b) pyrolyzing said composite material to separate said organic constituents from said inorganic constituents and form pyrolyzed organic constituents;
   (c) recycling said pyrolyzed organic constituents;
   (d) adding to said inorganic constituents an additive which interacts with said inorganic constituents to form the recycled material; and
   (e) fusing said recycling additive and said inorganic constituents.

19. A method according to claim 18 wherein step (a) comprises: p1 (1) removing gross contamination from gathered material-to-be-recycled;
   (2) comminuting said material-to-be-recycled; and
   (3) loading said material-to-be-recycled into a first chamber suitable for pyrolysis.

20. The method of claim 18 wherein said ceramic-reinforced thermosetting polymer composite material is pyrolyzed at a temperature of at least about 500° F.

21. The method of claim 18 wherein said fusing step (e) comprises heating said an additive which interacts with said inorganic constituents to form the recycled material and said inorganic constituents to a temperature of at least about 2000° F. to fuse together and form a material having substantially all of said inorganic constituents therein.

22. The method of claim 18 wherein said reinforced thermosetting polymer composite material is a reinforced thermosetting composite material selected from the group consisting of composites of polyester, vinyl ester, epoxy, polyurethane, phenolic, diallyl phthalate, melamine, furane, urea, polyimide, and mixtures thereof.

23. The method of claim 18 wherein said ceramic reinforced thermosetting polymer composite material is a ceramic reinforced thermosetting composite material having a ceramic reinforcement material selected from the group consisting of carbides, oxides, nitrides, and mixtures thereof.

24. The method of claim 18 wherein said ceramic reinforced thermosetting polymer composite material is a glass reinforced thermosetting polymer composite material having a glass reinforcement material selected from the group consisting of E-glass, S-glass, C-glass, and mixtures thereof.

25. The method of claim 23 wherein said ceramic reinforced thermosetting polymer composite material is a ceramic reinforced thermosetting polymer composite material having a fiber reinforcement material therein.

26. The method of claim 18 wherein said additive which interacts with said inorganic constituents to form the recycled material is a ceramic additive selected from the group consisting of silica, soda ash, salt cake sodium nitrate, potash, limestone, dolomite, boric acid, borax, feldspar, fluorspar, bauxite, kaolin clay, ball clay and mixtures thereof.

27. The method of claim 18 wherein said additive which interacts with said inorganic constituents to form the recycled material is a glass additive selected from the group consisting of glass formers, glass intermediates, glass modifiers and mixtures thereof.

28. The method of claim 27 wherein said additive which interacts with said inorganic constituents to form the recycled material is a compound containing an element selected from the group consisting of boron, silicon, germanium, aluminum, phosphorus, vanadium, arsenic, antimony, zirconium and mixtures thereof.

29. The method of claim 27 wherein said additive which interacts with said inorganic constituents to form the recycled material is a compound containing an element selected rom the group consisting of titanium, zinc, lead, aluminum, thorium, beryllium, zirconium, cadmium and mixtures thereof.

30. The method of claim 27 wherein said additive which interacts with said inorganic constituents to form the recycled material is a compound containing an element selected from the group consisting of scandium, lanthanum, yttrium, tin, gallium, indium, thorium, lead, magnesium, lithium, zinc, barium, calcium, strontium, cadmium, sodium, potassium, rubidium, mercury, cesium and mixtures thereof.

31. The method of claim 18 wherein said ceramic reinforced thermosetting composite material is a sheet molding compound.

32. The method of claim 18 wherein step (d) occurs prior to step (b).

33. The method of claim 18 wherein said step (d) occurs after step (b).

34. A method for recycling sheet molding compound materials comprising the steps of:
   (a) providing a sheet molding compound having organic and inorganic constituents therein;

(b) pyrolyzing said sheet molding compound by heating to a temperature of at least about 500° F. to separate substantially all of said organic constituents from said inorganic constituents and to create an ash from the inorganic constituents;

(c) using said separated organic constituents as fuel to sustain pyrolysis;

(d) transferring said ash constituents to a glass melting furnace;

(e) adding a glass-additive to said inorganic constituents;

(f) heating said glass additive and said ash to a temperature of at least about 2000° F. to create a molten glass and;

(g) cooling said molten glass.

35. The method of claim 34 wherein said sheet molding compound is a sheet molding compound having therein as the organic constituents a thermosetting resin, a low profile additive, a mold release agent and a catalyst.

36. The method of claim 34 wherein said sheet molding compound is a sheet molding compound having E-glass reinforcement, thickener, and a filler therein.

37. The method of claim 34 wherein said glass additive is selected from the group consisting of silicon dioxide, alumina, boron oxide, sodium oxide, calcium oxide, magnesium oxide, and iron oxide.

38. After each occurrence of "glass", please delete "charge".

39. The method of claim 34 wherein the glass is air-cooled to cool said glass.

40. The method of claim 34 wherein said glass additive is a glass forming compound containing an element selected from the group consisting of boron, silicon, germanium, aluminum, phosphorus, vanadium, arsenic, antimony, zirconium and mixtures thereof.

41. The method of claim 34 wherein said glass additive is a glass intermediate compound containing an element selected from the group consisting of titanium, zinc, lead, aluminum, thorium, beryllium, zirconium, cadmium and mixtures thereof.

42. The method of claim 34 wherein said glass additive is a glass modifier compound containing an element selected from the group consisting of scandium, lanthanum, yttrium, tin, gallium, indium, thorium, lead, magnesium, lithium, zinc, barium, calcium, strontium, cadmium, sodium, potassium, rubidium, mercury, cesium and mixtures thereof.

43. A new method for recycling a reinforced plastic composite material comprising the steps of:

(a) providing a reinforced plastic composite material having a reinforcement material including inorganic constituents and a plastic matrix material therein;

(b) combusting said reinforced plastic composite material to separate said plastic matrix material from said reinforcement material; and (c) forming a virgin glass material from said inorganic constituent of said separated reinforcement material.

44. The method of claim 43 wherein said providing step (a) additionally comprises:

(1) removing gross contamination from gathered material-to-be-recycled; and (2) comminuting said gathered material.

45. The method of claim 43 wherein said combusting step (b) additionally comprises:

(1) heating said composite material to combust said composite material's organic constituents; and (2) transferring ash material remaining from said composite material which has failed to undergo substantial decomposition during combustion to a second chamber having a suitable furnace for fusing said remaining ash material.

46. The method of claim 43 wherein step (c) comprises:

(1) adding an additive which interacts with said inorganic constituents to form the recycled material to said reinforcement material; and (2) heating said system to fuse together and form a recycled material.

47. The method of claim 43 wherein an additive which interacts with said inorganic constituents to form the recycled material is added at a time prior to combusting said reinforced plastic composite.

48. The method of claim 43 wherein an additive which interacts with said inorganic constituents to form the recycled material is added after the reinforced plastic composite has been combusted.

49. The method of claim 40 wherein said reinforced plastic composite material is a reinforced thermoplastic composite material.

50. The method of claim 43 wherein said reinforced plastic composite material is a reinforced thermosetting composite material.

51. The method of claim 43 wherein said reinforced plastic composite material is a ceramic reinforced plastic composite material.

52. The method of claim 51 wherein said reinforced plastic composite material is a glass reinforced plastic composite material.

53. The method of claim 51 wherein said reinforced plastic composite material is a carbide ceramic reinforced plastic composite material.

54. The method of claim 1 wherein said reinforced plastic composite material is a ceramic fiber reinforced plastic composite material.

55. The method of claim 43 wherein said reinforced plastic composite material is a reinforced thermoplastic composite material selected from the group consisting of composites of polyethylene, polypropylene, nylon, polyvinyl chloride, polyacetal, acrylonitrile-butadiene-styrene polymer, polyamide-imide polymer, polycarbonate, polyphenylene sulfide, polysulfone, polyether, polyether-ketone polymer, polyether-imide polymer, and mixtures thereof.

56. The method of claim 43 wherein said reinforced plastic composite material is a reinforced thermosetting composite material selected from the group consisting of composites of polyester, vinyl ester, epoxy, polyurethane, phenolic, diallyl phthalate, melamine, furane, urea, polyimide, and mixtures thereof.

57. The method of claim 43 wherein said reinforced plastic composite material comprises a matrix comprising a mixture of thermoplastic and thermosetting plastic materials.

58. The method of claim 46 wherein said additive which interacts with said inorganic constituents to form the recycled material is a ceramic additive selected from the group consisting of silica, soda ash, salt cake, sodium nitrate, potash, limestone, dolomite, boric acid, borax, feldspar, fluorspar, bauxite, kaolin clay, ball clay and mixtures thereof.

59. The method of claim 46 wherein said additive which interacts with said inorganic constituents to form the recycled material is a glass additive selected from the group consisting of glass formers, glass intermediates, glass modifiers and mixtures thereof.

* * * * *